(12) United States Patent
Nakagawa et al.

(10) Patent No.: US 12,001,041 B2
(45) Date of Patent: *Jun. 4, 2024

(54) MULTILAYER LAMINATE FILM (71) Applicant: TOYOBO CO., LTD., Osaka (JP)

(72) Inventors: Dai Nakagawa, Tokyo (JP); Nobuyuki Nakanishi, Tokyo (JP); Shigeyuki Watanabe, Tokyo (JP)

(73) Assignee: TOYOBO CO., LTD., Osaka (JP)

( * ) Notice: Subject to any disclaimer, the term of this patent is extended or adjusted under 35 U.S.C. 154(b) by 732 days.

This patent is subject to a terminal disclaimer.

(21) Appl. No.: 17/278,232

(22) PCT Filed: Sep. 12, 2019

(86) PCT No.: PCT/JP2019/035948
§ 371 (c)(1),
(2) Date: Mar. 19, 2021

(87) PCT Pub. No.: WO2020/066668
PCT Pub. Date: Apr. 2, 2020

(65) Prior Publication Data
US 2021/0349247 A1    Nov. 11, 2021

(30) Foreign Application Priority Data

Sep. 27, 2018    (JP) ................. 2018-182867

(51) Int. Cl.
*G02B 5/28* (2006.01)
*G02B 5/30* (2006.01)
(Continued)

(52) U.S. Cl.
CPC .......... *G02B 5/305* (2013.01); *G02B 5/3083* (2013.01); *B32B 7/023* (2019.01); *B32B 27/08* (2013.01);
(Continued)

(58) Field of Classification Search
CPC . B32B 2307/416; B32B 2307/42; G02B 5/28; G02F 1/133536
See application file for complete search history.

(56) References Cited

U.S. PATENT DOCUMENTS 5,486,949 A    1/1996    Schrenk et al.
5,612,820 A    3/1997    Schrenk et al.
(Continued)

FOREIGN PATENT DOCUMENTS

CN    102317819 A    1/2012
CN    103907035 A    7/2014
(Continued)

OTHER PUBLICATIONS

Li et al., "Design Optimization of Reflective Polarizers for LCD Backlight Recycling," *Journal of Display Technology*, 5(8): 335-340 (2009).
(Continued)

*Primary Examiner* — Wen Huang
(74) *Attorney, Agent, or Firm* — Leydig, Voit & Mayer, Ltd.

(57) ABSTRACT

The invention provides a multilayer laminated film with alternately laminated birefringent and isotropic layers. The birefringent layers have a first monotonically increasing region of optical thickness and contain monotonically increasing region 1A of maximum optical thickness is 100 nm or less, and monotonically increasing region 1B of minimum optical thickness of more than 100 nm, and ratio 1B/1A of slope 1B of monotonically increasing region 1B to slope 1A of monotonically increasing region 1A is 0.8 or more and less than 1.5. The isotropic layers have a second monotonically increasing region of optical thickness and contain monotonically increasing region 2A of maximum optical thickness of 200 nm or less and monotonically increasing region 2B of minimum optical thickness of more
(Continued)

than 200 nm, and ratio 2B/2A of slope 2B of monotonically increasing region 2B to slope 2A of monotonically increasing region 2A is more than 1.5 and less than 5.

8 Claims, 2 Drawing Sheets

(51) Int. Cl.
  *B32B 7/023* (2019.01)
  *B32B 27/08* (2006.01)
  *B32B 27/36* (2006.01)
  *G02F 1/1335* (2006.01)

(52) U.S. Cl.
  CPC ......... *B32B 27/36* (2013.01); *B32B 2250/244* (2013.01); *B32B 2250/42* (2013.01); *B32B 2307/416* (2013.01); *B32B 2307/42* (2013.01); *B32B 2307/732* (2013.01); *B32B 2551/00* (2013.01); *G02B 5/28* (2013.01); *G02F 1/133536* (2013.01)

(56) References Cited

U.S. PATENT DOCUMENTS

| | | | |
|---|---|---|---|
| 5,872,653 A | 2/1999 | Schrenk et al. | |
| 6,583,930 B1 | 6/2003 | Schrenk et al. | |
| 6,677,031 B1 | 1/2004 | Murooka et al. | |
| 9,213,129 B2 | 12/2015 | Han et al. | |
| 2005/0270439 A1 | 12/2005 | Weber et al. | |
| 2011/0003957 A1 | 1/2011 | Arishima et al. | |
| 2011/0249332 A1 | 10/2011 | Merrill et al. | |
| 2011/0249334 A1 | 10/2011 | Merrill et al. | |
| 2011/0255163 A1 | 10/2011 | Merrill et al. | |
| 2011/0255167 A1 | 10/2011 | Merrill et al. | |
| 2011/0286095 A1 | 11/2011 | Merrill et al. | |
| 2014/0240829 A1 | 8/2014 | Weber et al. | |
| 2014/0308491 A1 | 10/2014 | Merrill et al. | |
| 2015/0146292 A1 | 5/2015 | Merrill et al. | |
| 2015/0192719 A1 | 7/2015 | Merrill et al. | |
| 2016/0109628 A1 | 4/2016 | Weber et al. | |
| 2016/0170113 A1 | 6/2016 | Merrill et al. | |
| 2016/0195659 A1 | 7/2016 | Johnson et al. | |
| 2016/0238761 A1 | 8/2016 | Weber et al. | |
| 2019/0346605 A1* | 11/2019 | Nevitt | B32B 7/023 |
| 2020/0025991 A1 | 1/2020 | Hirose et al. | |
| 2021/0349246 A1 | 11/2021 | Nakagawa et al. | |
| 2021/0349249 A1 | 11/2021 | Nakagawa et al. | |

FOREIGN PATENT DOCUMENTS

| | | |
|---|---|---|
| CN | 107615117 A | 1/2018 |
| JP | H04-268505 A | 9/1992 |
| JP | H09-506837 A | 7/1997 |
| JP | H09-506984 A | 7/1997 |
| JP | 2002-509280 A | 3/2002 |
| KR | 10-1399425 B1 | 5/2014 |
| WO | WO 1995/017303 A1 | 6/1995 |
| WO | WO 1995/017699 A1 | 6/1995 |
| WO | WO 1999/036809 A1 | 7/1999 |
| WO | WO 2001/047711 A1 | 7/2001 |
| WO | WO 2018/013784 A2 | 1/2018 |
| WO | WO 2018/052872 A1 | 3/2018 |
| WO | WO 2018/181841 A1 | 10/2018 |
| WO | WO 2019/163891 A1 | 8/2019 |
| WO | WO 2020/066666 A1 | 4/2020 |
| WO | WO 2020/066667 A1 | 4/2020 |

OTHER PUBLICATIONS

Korean Intellectual Property Office, Office Action in Korean Patent Application No. 10-2021-7009812 (dated Jul. 13, 2023).
Japanese Patent Office, International Search Report in International Patent Application No. PCT/JP2019/035946 (dated Nov. 12, 2019).
Japanese Patent Office, International Search Report in International Patent Application No. PCT/JP2019/035947 (dated Nov. 12, 2019).
Japanese Patent Office, International Search Report in International Patent Application No. PCT/JP2019/035948 (dated Nov. 12, 2019).
U.S. Appl. No. 17/278,209, filed Mar. 19, 2021.
U.S. Appl. No. 17/278,216, filed Mar. 19, 2021.

* cited by examiner

MULTILAYER LAMINATE FILM

CROSS-REFERENCE TO RELATED APPLICATIONS

This patent application is the U.S. national phase of International Patent Application No. PCT/JP2019/035948, filed on Sep. 12, 2019, which claims the benefit of Japanese Patent Application No. 2018-182867, filed on Sep. 27, 2018, which are incorporated by reference in their entireties herein.

TECHNICAL FIELD

The present disclosure relates to a multilayer laminated film that can widely reflect light in a visible light region.

BACKGROUND ART

A multilayer laminated film in which many layers with a low refractive index and many layers with a high refractive index are alternately laminated can be used as an optical interference film that selectively reflects or transmits light with a specific wavelength due to optical interference caused from the layered structure. Further, by gradually changing the film thickness of each layer along the thickness direction, or by bonding together films having different reflection peaks, such a multilayer laminated film can reflect or transmit light in a wide wavelength range, attain a reflectance as high as a film using metal, and be used as a metallic luster film or a reflective mirror. Further, it is known that by stretching such a multilayer laminated film in one direction, the multilayer laminated film can also be used as a reflective polarizing film that reflects only a specific polarization component, and be used, for example, as a luminance-improving member for liquid crystal displays or the like (Patent Literature (PTL) 1 to Patent Literature (PTL) 4, etc.).

These multilayer laminated films are often required to have a higher reflectance in an arbitrary wavelength range. However, since the number of layers that can be laminated is limited, it is very difficult to achieve a high reflectance over a broad reflection wavelength range. In addition, increasing only the reflectance of light in a specific wavelength range might lead to a decrease in reflectance of light in other reflection wavelength ranges, causing an optical quality problem.

CITATION LIST

Patent Literature

PTL 1: JPH04-268505A
PTL 2: JPH09-506837A
PTL 3: JPH09-506984A
PTL 4: WO01/47711

SUMMARY OF INVENTION

Technical Problem

On the other hand, the multilayer laminated films can be required to have a high degree of polarization in addition to maintaining a wide reflection wavelength range. Additionally, the multilayer laminated films can also be required to have uniform color at the same time. Further, the multilayer laminated films described above can have a reddish look (color) in the entire film when viewed from an oblique direction, and such a reddish look (color) may be required to be reduced at the same time. In particular, a multilayer laminated film, which is desired to be smaller and lighter, has a limited number of layers; therefore, within a limited thickness range or limited weight range, the multilayer laminated film is required to satisfy the above requirements.

An object of the present disclosure is to provide a multilayer laminated film that has a high degree of polarization, and uniform color, as well as reduced color when viewed from an oblique direction, while maintaining a wide reflection wavelength range.

Solution to Problem

Means for solving the problems include the following embodiments.

1. A multilayer laminated film comprising a multilayer laminate in which a birefringent layer comprising a first resin and an isotropic layer comprising a second resin are alternately laminated,
    the multilayer laminated film being capable of reflecting light with a wavelength of 380 to 780 nm due to optical interference caused from the lamination structure of the birefringent layer and the isotropic layer,
    a series of the birefringent layers having a first monotonically increasing region of optical thickness, wherein the first monotonically increasing region comprises a monotonically increasing region 1A in which the maximum optical thickness is 100 nm or less, and a monotonically increasing region 1B in which the minimum optical thickness is more than 100 nm, and a ratio 1B/1A of a slope 1B of the monotonically increasing region 1B to a slope 1A of the monotonically increasing region 1A is 0.8 or more and 1.5 or less,
    a series of the isotropic layers having a second monotonically increasing region of optical thickness, wherein the second monotonically increasing region comprises a monotonically increasing region 2A in which the maximum optical thickness is 200 nm or less and a monotonically increasing region 2B in which the minimum optical thickness is more than 200 nm, and a ratio 2B/2A of a slope 2B of the monotonically increasing region 2B to a slope 2A of the monotonically increasing region 2A is more than 1.5 and less than 5.
2. The multilayer laminated film according to Item 1, wherein the monotonically increasing region 1A has an average optical thickness of 65 nm or more and 85 nm or less, and the monotonically increasing region 1B has an average optical thickness of 140 nm or more and 160 nm or less.
3. The multilayer laminated film according to Item 1 or 2, wherein the monotonically increasing region 2A has an average optical thickness of 130 nm or more and 155 nm or less, and the monotonically increasing region 2B has an average optical thickness of 250 nm or more and 290 nm or less.
4. The multilayer laminated film according to any one of Items 1 to 3, having an average reflectance of light polarized parallel to a reflection axis at normal incidence of 85% or more in a wavelength range of 380 nm to 780 nm.

Advantageous Effects of Invention

According to present disclosure, a multilayer laminated film that has a high degree of polarization, and uniform color, as well as reduced color when viewed from an oblique direction while maintaining a wide reflection wavelength range is provided.

DESCRIPTION OF EMBODIMENTS

An embodiment, which is an example of the present disclosure, is described below. The present disclosure is in no way limited to the following embodiment, and can be implemented with appropriate modifications within the scope of the present disclosure.

In the present specification, a numerical range indicated by " . . . to . . . " means a range including the numerical values given before and after "to" as the lower limit and the upper limit.

Multilayer Laminated Film

The multilayer laminated film according to one embodiment of the present disclosure comprises a multilayer laminate in which a birefringent layer comprising a first resin and an isotropic layer comprising a second resin are alternately laminated. The film can reflect light in a broad wavelength range of 380 to 780 nm in a visible light region due to optical interference caused by the lamination of the birefringent layers and the isotropic layers. The film can reflect light, for example, in a wavelength range of 400 to 760 nm, and preferably a wavelength range of 380 to 780 nm. In the present disclosure, the phrase "can reflect" or "capable of reflecting" means that in at least one arbitrary direction on the film surface, the average reflectance at perpendicular incidence of polarized light parallel to the direction is 50% or more. In terms of the average reflectance in each wavelength range, this reflection can be 50% or more, preferably 60% or more, more preferably 70% or more, and still more preferably 85% or more, and so the multilayer laminated film maintains a wide reflection wavelength range.

In the present disclosure, the average reflectance is a value obtained by subtracting from 100 the average transmittance at the wavelength of 380 to 780 nm, which is determined using a polarizing film measurement apparatus (VAP7070S, manufactured by JASCO Corporation).

In the present disclosure, "composed mainly of a resin" means that the resin in each layer accounts for 70 mass % or more, preferably 80 mass % or more, and more preferably 90 mass % or more, of the total mass of each layer.

In order to achieve such reflection properties, the multilayer laminate of alternating layers preferably has a structure in which a birefringent layer and an isotropic layer are alternately laminated in the thickness direction so that the total number of the birefringent layers and the isotropic layers laminated is 30 or more, each birefringent layer being composed mainly of a first resin and having a film thickness of 10 to 1000 nm, and each isotropic layer being composed mainly of a second resin and having a film thickness of 10 to 1000 nm. The resin that forms the birefringent layers and the resin that forms the isotropic layers, which will be described in detail below, are not particularly limited as long as they can form a layer having birefringent properties and a layer having isotropic properties, respectively. Both of the resins are preferably thermoplastic resin from the viewpoint of easy production of the film. In the present disclosure, with respect to refractive indexes in the machine direction, the traverse direction, and the thickness direction, a layer having a reflective index difference of 0.1 or more between the maximum and the minimum is defined as being birefringent, and a layer having a reflective index difference of less than 0.1 is defined as being isotropic.

Layer Thickness Profile

The multilayer laminated film according to one embodiment of the present disclosure can reflect light in a wide wavelength range by having the laminated structure of birefringent layers and isotropic layers with various optical thicknesses. This is because the reflection wavelength is due to the optical thickness of each layer that constitutes the multilayer laminated film. In general, the reflection wavelength of the multilayer laminated film is represented by the following Formula 1.

$$\lambda = 2(n1 \times d1 + n2 \times d2) \quad \text{(Formula 1)}$$

(In Formula 1, λ represents a reflection wavelength (nm); n1 and n2 represent the refractive index of the birefringent layer and the refractive index of the isotropic layer, respectively; and d1 and d2 represent the physical thickness (nm) of the birefringent layer and the physical thickness (nm) of the isotropic layer, respectively.)

Further, an optical thickness λm (nm) is represented by the product of a refractive index nk and a physical thickness dk of each layer as in the following Formula 2. For the physical thickness, one obtained from a photograph taken with a transmission electron microscope can be used.

$$\lambda M (\text{nm}) = nk \times dk \quad \text{(Formula 2)}$$

In view of the above, it is possible to obtain a layer thickness profile with which light can be widely reflected at a wavelength of from 380 to 780 nm. For example, the multilayer laminated film can be designed to reflect light in a wide wavelength range by widening the thickness range in the monotonously increasing region described below, or can be designed to reflect light in a specific wavelength range in the monotonously increasing region, and reflect light outside the specific wavelength range in other regions to thereby reflect light in a broad wavelength range as a whole.

In one embodiment of the present disclosure, the birefringent layer and the isotropic layer each have a specific layer thickness profile, which makes it possible to obtain a multilayer laminated film having a high degree of polarization, and uniform color, as well as reduced color when viewed from an oblique direction while maintaining a wide reflection wavelength range.

Figure 1:
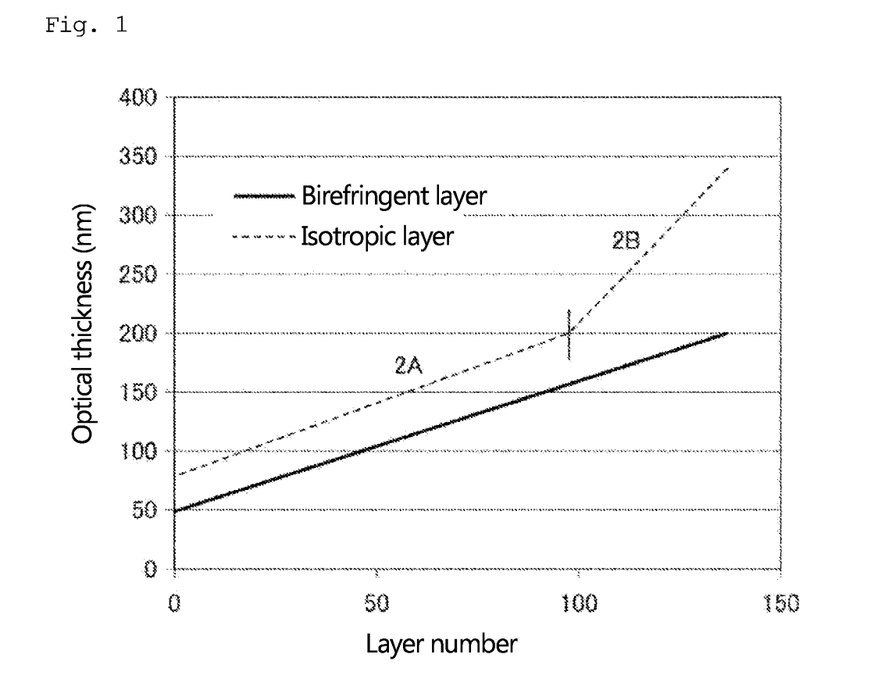
FIG. 1 is a schematic view showing an example of a layer thickness profile of a multilayer laminated film according to the present disclosure.
Figure 2:
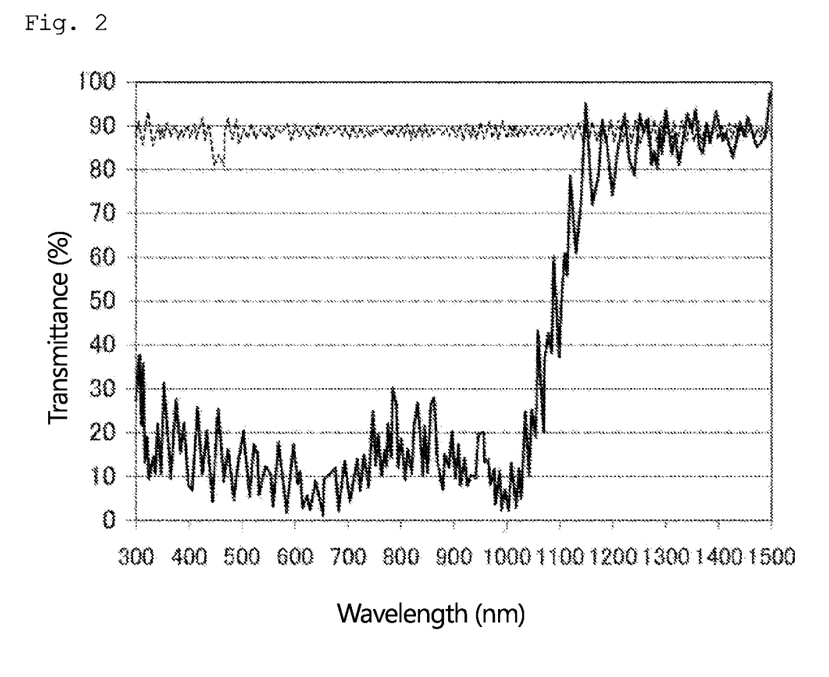
FIG. 2 is a graph showing transmission spectra in terms of the transmission axis and the reflection axis of a multilayer laminated film according to the present disclosure.

More specifically, the layer thickness profile of the birefringent layers in terms of optical thickness has a first monotonically increasing region. The first monotonically increasing region comprises a monotonically increasing region 1A in which the maximum optical thickness is 100 nm or less, and a monotonically increasing region 1B in which the minimum optical thickness is more than 100 nm, and a ratio 1B/1A of the slope 1B of the monotonically increasing region 1B to the slope 1A of the monotonically increasing region 1A is 0.8 or more and 1.5 or less. At the same time, the layer thickness profile of the isotropic layers in terms of optical thickness has a second monotonically increasing region. The second monotonically increasing region comprises a monotonically increasing region 2A in which the maximum optical thickness is 200 nm or less and a monotonically increasing region 2B in which the minimum optical thickness is more than 200 nm, and a ratio 2B/2A of the slope 2B of the monotonically increasing region 2B to the slope 2A of the monotonically increasing region 2A is more than 1.5 and less than 5. FIG. 1 is a schematic view of an example of a layer thickness profile of a multilayer laminated film according to the present disclosure. FIG. 2 is a graph showing transmission spectra in terms of the transmission axis and the reflection axis of a multilayer laminated film having the layer thickness profile shown in FIG. 1.

FIG. 1 shows a layer thickness profile in which the ratio 1B/1A of the slope 1B of the monotonically increasing region 1B to the slope 1A of the monotonically increasing region 1A is 1.0, and the ratio 2B/2A of the slope 2B of the monotonically increasing region 2B to the slope 2A of the monotonically increasing region 2A is 3.0. FIG. 2 shows a transmission spectrum in terms of the transmission axis (dotted line) and a transmission spectrum in terms of the reflection axis (solid line) of a multilayer laminated film having the layer thickness profile shown in FIG. 1. The degree of polarization of the multilayer laminated film calculated from the transmission spectra of FIG. 2 is 79.0%, and the average transmittance of light with a wavelength of 380 to 780 nm in the direction of the reflection axis is 11.6% (average reflectance: 88.4%). This suggests that the multilayer laminated film according to the present disclosure has a wide reflection wavelength range of 380 to 780 nm.

As shown as examples in FIG. 1, the monotonically increasing region 1A having the slope 1A and the monotonically increasing region 1B having the slope 1B, which constitute the first monotonically increasing region, serve as a continuous region that satisfies the ratio 1B/1A of 0.8 or more and 1.5 or less, and have an optical thickness of 100 nm at the boundary. Further, the monotonically increasing region 2A having the slope 2A and the monotonically increasing region 2B having the slope 2B, which constitute the second monotonically increasing region, serve as a continuous region that satisfies the ratio 2B/2A of more than 1.5 and less than 5, and have an optical thickness of 200 nm at the boundary.

When the ratio 1B/1A and the ratio 2B/2A of the slopes simultaneously satisfy the above ranges, a multilayer laminated film having a high degree of polarization, and uniform color, as well as reduced color when viewed from an oblique direction while maintaining a wide reflection wavelength range can be obtained. This is because when the above ratios of the slopes are simultaneously satisfied, the resulting multilayer laminated film can achieve a higher reflectance while having a broader reflection wavelength range. Conventionally, the reflection wavelength range tends to be narrow when a high reflectance is achieved. However, in one embodiment of the present disclosure, a multilayer laminated film having a high degree of polarization, and uniform color, as well as reduced color when viewed from an oblique direction while maintaining a wide reflection wavelength range can be obtained.

An increase in the number of layers theoretically can achieve a high degree of polarization in a wide reflection wavelength range. However, an increase in the number of layers usually requires a change in equipment. In the multilayer laminated film according to this embodiment, if the ratio 1B/1A of the slopes is adjusted to 0.8 or more and 1.5 or less, and the ratio 2B/2A of the slopes to more than 1.5 and less than 5, it is possible to produce a multilayer laminated film that maintains a wide reflection wavelength range, and has a high degree of polarization, and uniform color, as well as reduced color when viewed from an oblique direction, without necessity of a particular expansion of existing equipment. Additionally, it is also possible to produce a multilayer laminated film without changing the number of layers from that of existing films.

The slope of a layer thickness profile as used in the present disclosure refers to a slope of a first approximate straight line based on the following method. That is, the slope of the first approximate straight line of the layer thickness profile of the monotonically increasing region 1A of the birefringent layer is defined as "1A," the slope of the first approximate straight line of the layer thickness profile of the monotonically increasing region 1B is defined as "1B," and 1B/1A is calculated using the obtained values. Further, the slope of the first approximate straight line of the layer thickness profile of the monotonically increasing region 2A of the isotropic layer is defined as "2A," the slope of the first approximate straight line of the layer thickness profile of the monotonically increasing region 2B is defined as "2B," and 2B/2A is calculated using the obtained values. In one embodiment of the present disclosure, the number of layers can be increased by doubling or the like, as described below. In such a case, it is only necessary to look at the layer thickness profile of one packet that can be a multilayer laminate of alternating layers. When looking at the overall layer thickness profile of a multilayer laminated film, for example, if there are multiple portions having similar layer thickness profiles, each portion can be regarded as a packet, and multilayer structure portions separated by, for example, an intermediate layer, can be regarded as separate packets.

For the birefringent layer, the optical thickness of the first monotonically increasing region at the boundary is set to 100 nm, and the ratio of the slope of the monotonically increasing region 1A, which has a smaller optical thickness, and the slope of the monotonically increasing region 1B, which has a greater optical thickness, is set to be within a specific range. This can uniformly increase the intensity of reflection of light with a wavelength of about 550 nm, at which light is visually well perceived, while widening the wavelength range for the first monotonically increasing region, and can uniformly improve the degree of polarization. However, when the ratio of the slopes (1B/1A) is more than 1.5, a high degree of polarization cannot be easily obtained. Setting the value at the boundary to 100 nm can further uniformly increase the intensity of reflection of light with a wavelength of about 550 nm. In the birefringent layer, if the optical thickness at the boundary is set to 150 nm or 200 nm, it tends to become difficult to uniformly adjust the intensity of reflection of light in any wavelength range.

For the isotropic layer, the optical thickness of the second monotonically increasing region at the boundary is set to 200 nm, and the ratio of the slope of the monotonically increasing region 2B, which has a greater optical thickness, to the slope of the monotonically increasing region 2A, which has a smaller optical thickness, is set to be within a specific range. This can widen the reflection wavelength range, and a high degree of polarization can be easily obtained. By setting the optical thickness at the boundary to 200 nm, and by relatively reducing the slope 2A in terms of the relation between slopes 2A and 2B, it is possible to adjust the reflection intensity to be uniform. By relatively increasing the slope 2B, it is possible to increase the reflection intensity in the desired wavelength range by using higher-order reflection, such as secondary reflection or tertiary reflection, while widening the reflection wavelength range.

From the above viewpoints, the value of the ratio 1B/1A is 0.8 or more and 1.5 or less. For example, an embodiment in which the lower limit is 0.8, 0.9, 0.95, or 1.00, an embodiment in which the upper limit is 1.5, 1.4, 1.3, or 1.25, and an embodiment in which any of these lower limits and upper limits are combined are preferable. More specifically, an embodiment in which the value of the ratio is 0.9 to 1.4, an embodiment in which the value is 0.95 to 1.3, an embodiment in which the value is 1.0 to 1.25, and the like are preferable. Further, the value of the ratio 2B/2A is more than 1.5 and less than 5. For example, an embodiment in which the lower limit is 1.7, 1.9, 2.1, 2.3, or 2.5, an embodiment in which the upper limit is 4.75, 4.5, 4.0, 3.75, or 3.5, and an embodiment in which any of these lower limits and upper limits are combined are preferable. More specifically, an embodiment in which the value of the ratio is 1.7 to 4.75, an embodiment in which the value is 1.9 to 4.5, an embodiment in which the value is 2.1 to 4.0, an embodiment in which the value is 2.3 to 3.75, an embodiment in which the value is 2.5 to 3.5, and the like are preferable.

Such a layer thickness profile can be obtained, for example, by adjusting the comb teeth in the feed block.

In the first monotonically increasing region, the slope 1A of the monotonically increasing region 1A, in which the optical thickness is 100 nm or less, is preferably 0.80 to 1.35, more preferably 0.85 to 1.30, and still more preferably 0.90 to 1.15. Further, the slope 1B of the monotonically increasing region 1B, in which the optical thickness is more than 100 nm, is preferably 0.80 to 1.35, more preferably 1.00 to 1.30, and still more preferably 1.05 to 1.25. In this manner, the effect achieved by the ratio of the slopes can further improve, the degree of polarization can be further prevented from decreasing, and color when viewed from an oblique direction can be further reduced.

In the second monotonically increasing region, the slope 2A of the monotonically increasing region 2A, in which the optical thickness is 200 nm or less, is preferably 1.00 to 1.60, more preferably 1.05 to 1.50, and still more preferably 1.15 to 1.35. Further, the slope 2B of the monotonically increasing region 2B, in which the optical thickness is more than 200 nm, is preferably 2.00 to 6.00, more preferably 2.50 to 5.50, and still more preferably 3.00 to 4.50. In this manner, the effect achieved by the ratio of the slopes can further improve, and the degree of polarization can be further prevented from decreasing.

In the first monotonically increasing region, the layer at the end on the side in which the optical thickness is smaller in the monotonically increasing region 1A preferably has an optical thickness (nm) of 40 to 60, more preferably 43 to 57, and still more preferably 46 to 54. Further, the layer at the end on the side in which the optical thickness is greater in the monotonically increasing region 1B preferably has an optical thickness of 180 to 220, more preferably 185 to 215, and still more preferably 190 to 210. In this manner, the effect achieved by the ratio of the slopes can further improve, and the degree of polarization can be further prevented from decreasing. Additionally, the reflection wavelength range can be widened.

In the second monotonically increasing region, the layer at the end on the side in which the optical thickness is smaller in the monotonically increasing region 2A preferably has an optical thickness (nm) of 70 to 90, more preferably 74 to 86, and still more preferably 78 to 82. Further, the layer at the end on the side in which the optical thickness is greater in the monotonically increasing region 2B preferably has an optical thickness of 295 to 385, more preferably 310 to 370, and still more preferably 325 to 355. In this manner, the effect achieved by the ratio of the slopes can further improve, and the degree of polarization can be further prevented from decreasing. Additionally, the reflection wavelength range can be widened.

In the first monotonically increasing region of the birefringent layer, the monotonically increasing region 1A preferably has an average optical thickness (also referred to below as the "average optical thickness") of 65 nm to 85 nm, and the monotonically increasing region 1B preferably has an average optical thickness of 140 nm to 160 nm. Thereby, the effect described above achieved by the layer thickness profile of the birefringent layer is more easily obtained, and the degree of polarization is more effectively prevented from decreasing.

In the second monotonically increasing region of the isotropic layer, the monotonically increasing region 2A preferably has an average optical thickness (also referred to below as the "average optical thickness") of 130 nm to 155 nm, and the monotonically increasing region 2B preferably has an average optical thickness of 250 nm to 290 nm. Thereby, the effect described above achieved by the layer thickness profile of the isotropic layer is more easily obtained, and the degree of polarization is more effectively prevented from decreasing.

Furthermore, when these values are all within the above ranges at the same time, a multilayer laminated film exhibiting a higher degree of polarization, and more uniform color, as well as reduced color when viewed from an oblique direction can be obtained.

To more easily achieve the above effects, the average optical thicknesses of the monotonically increasing region 1A and the monotonically increasing region 1B of the birefringent layer are preferably 67 nm to 83 nm and 143 nm to 157 nm, respectively. The thicknesses are more preferably 69 nm to 81 nm and 146 nm to 154 nm, respectively.

To more easily achieve the above effects, the average optical thicknesses of the monotonically increasing region 2A and the monotonically increasing region 2B of the isotropic layer are preferably 133 nm to 152 nm and 255 nm to 285 nm, respectively. The thicknesses are more preferably 136 nm to 149 nm and 260 nm to 280 nm, respectively.

Monotonically Increasing Region

In the present disclosure, "monotonically increasing" preferably means that in the entire multilayer laminate of alternating layers of the multilayer laminated film, a thicker-side layer is thicker than a thinner-side layer; however, this is not limitative. It is sufficient as long as there is a tendency for the thickness to increase from the thinner side to the thicker side as seen in the entire view. More specifically, when the layers are numbered from the thinner side to the thicker side in terms of optical thickness, and the film thickness of each layer is plotted on the ordinate with the layer number of each numbered layer being plotted on the abscissa, the number of layers within the range showing a tendency of increasing film thickness is equally divided into five. If the average values of the film thicknesses in each equally divided area all increase in the direction in which the film thickness increases, the tendency is regarded as a monotonic increase; if this is not the case, the tendency is not regarded as a monotonic increase. Note that the birefringent layers and the isotropic layers can be viewed individually, and the monotonic increase of the birefringent layers and the monotonic increase of the isotropic layers may have different slopes. Moreover, the monotonic increase described above may be in an embodiment in which the thickness monotonically increases entirely from one outermost layer to the other outermost layer in the multilayer laminate of alternating layers. In some embodiments, the monotonously increasing thickness region may account for 80% or more, preferably 90% or more, and more preferably 95% or more, of the multilayer laminate of alternating layers in terms of the number of layers; and the thickness in the remaining portion may be constant, or decrease. For example, Example 1 according to the present disclosure is an embodiment in which the thickness monotonically increases in the 100% portion of the multilayer laminated structure. In some embodiments, the multilayer laminated film may include a region where the thickness does not monotonically increase at the smaller layer number side and/or the larger layer number side of the thickness profile described above.

In one embodiment of present disclosure, a region in which the ratio 1B/1A above is 0.8 or more and 1.5 or less in the monotonically increasing region of the birefringent layer is referred to as a "first monotonically increasing region," while a region in which the ratio 2B/2A above is more than 1.5 and less than 5 in the monotonically increasing region of the isotropic layer is referred to as a "second monotonically increasing region."

The birefringent layer and isotropic layer are alternately laminated to form a multilayer laminate. Thus, it is sufficient as long as the monotonically increasing regions of the birefringent layer and the isotropic layer have a range capable of reflecting light with a wavelength of 380 to 780 nm due to optical interference caused from the multilayer laminated structure. Further, the monotonically increasing regions of the birefringent layer and the isotropic layer may be larger than the range that is capable of reflecting light with a wavelength of 380 to 780 nm when a multilayer laminate of alternating layers is formed.

Structure of Multilayer Laminated Film Birefringent Layer

The birefringent layer of the multilayer laminated film according to one embodiment of the present disclosure has birefringent properties. That is, the resin that forms the birefringent layer (also referred to as the "first resin" in the present disclosure) is capable of forming birefringent layers. Accordingly, the resin that forms the birefringent layer is preferably an oriented crystalline resin, and the oriented crystalline resin is especially preferably a polyester. The polyester preferably contains ethylene terephthalate units and/or ethylene naphthalate units, more preferably ethylene naphthalate units, in an amount in the range of 80 mol % or more to 100 mol % or less, based on the repeating units constituting the polyester; this is because a layer having a higher refractive index can thereby be readily formed, which makes it easy to increase the difference in refractive index between the birefringent layer and the isotropic layer. Here, in the case of the combined use of resins, the content is the total content.

Polyester for Birefringent Layer

A preferred polyester for birefringent layers contains a naphthalenedicarboxylic acid component as a dicarboxylic acid component, and the content of the naphthalenedicarboxylic acid component is preferably 80 mol % or more and 100 mol % or less, based on the dicarboxylic acid component of the polyester. Examples of the naphthalenedicarboxylic acid component include a 2,6-naphthalenedicarboxylic acid component, a 2,7-naphthalenedicarboxylic acid component, components derived from a combination of these components, and derivative components thereof. Particularly preferred examples include a 2,6-naphthalenedicarboxylic acid component and derivative components thereof. The content of the naphthalenedicarboxylic acid component is preferably 85 mol % or more, more preferably 90 mol % or more; and is preferably less than 100 mol %, more preferably 98 mol % or less, and even more preferably 95 mol % or less.

The polyester for birefringent layers may further contain a terephthalic acid component, an isophthalic acid component, or the like, especially preferably a terephthalic acid component, as a dicarboxylic acid component of the polyester for birefringent layers, in addition to the naphthalenedicarboxylic acid component as long as the object of the present disclosure is not impaired. The content of the additional dicarboxylic acid component is preferably in the range of more than 0 mol % and 20 mol % or less, more preferably 2 mol % or more, and even more preferably 5 mol % or more; and is more preferably 15 mol % or less, and even more preferably 10 mol % or less.

When the multilayer laminated film is used as a luminance-improving member or a reflective polarizer for use in a liquid crystal display or the like, it is preferred that the birefringent layers have relatively higher refractive index properties than the isotropic layers, that the isotropic layers have relatively lower refractive index properties than the birefringent layers, and that the film be stretched in a uniaxial direction. In this case, in the present disclosure, the uniaxially stretching direction may be referred to as the "X direction," the direction orthogonal to the X direction on the film plane may be referred to as the "Y direction" (also referred to as the "non-stretching direction"), and the direction perpendicular to the film plane may be referred to as the "Z direction" (also referred to as the "thickness direction").

When the birefringent layer comprises a polyester containing a naphthalenedicarboxylic acid component as the main component as described above, the birefringent layer can show a high refractive index in the X direction, and also simultaneously achieve high birefringence characteristics with high uniaxial orientation; this can increase the refractive index difference in the X direction between the birefringent layer and the isotropic layer, thus contributing to a high degree of polarization. In contrast, if the content of the naphthalenedicarboxylic acid component is less than the lower limit, amorphous properties tend to increase; and the difference between a refractive index in the X direction, nX, and a refractive index in the Y direction, nY, tends to decrease. Therefore, the multilayer laminated film is less likely to obtain satisfactory reflection performance of the P-polarized light component (in the present disclosure), which is defined as a polarized light component being parallel to the incidence plane including the uniaxially stretching direction (X direction), with the film surface being used as a reflection surface. In the multilayer laminated film, the S-polarized light component (in the present disclosure) is defined as a polarized light component being perpendicular to the incidence plane that includes the uniaxially stretching direction (X direction), with the film surface being used as a reflection surface.

As the diol component of a preferred polyester for birefringent layers, an ethylene glycol component is used. The content of the ethylene glycol component is preferably 80 mol % or more and 100 mol % or less, more preferably 85 mol % or more and 100 mol % or less; and even more preferably 90 mol % or more and 100 mol % or less, and particularly preferably 90 mol % or more and 98 mol % or less, based on the diol component of the polyester. If the amount of the diol component is less than the lower limit, the uniaxial orientation described above may be impaired.

The polyester for birefringent layers may further contain a trimethylene glycol component, a tetramethylene glycol component, a cyclohexanedimethanol component, a diethylene glycol component, or the like as a diol component of the polyester for birefringent layers, in addition to the ethylene glycol component, as long as the object of the present disclosure is not impaired.

Properties of Polyester for Birefringent Layer

The melting point of the polyester for birefringent layers is preferably in the range of 220 to 290° C., more preferably 230 to 280° C., and even more preferably 240 to 270° C. The melting point can be determined by measurement using a differential scanning calorimeter (DSC). When the melting point of the polyester is more than the upper limit, fluidity is likely to be poor when molding through melt extrusion is performed, thus causing extrusion or the like to be non-uniform. On the other hand, if the melting point is less than the lower limit, excellent film formability is attained, but the mechanical properties etc. of the polyester are likely to worsen; additionally, it tends to be difficult for the film to exhibit the refractive index properties required when used as a luminance-improving member or a reflective polarizer for a liquid crystal display.

The glass transition temperature (sometimes referred to below as "Tg") of the polyester used for birefringent layers is preferably in the range of 80 to 120° C., more preferably 82 to 118° C., even more preferably 85 to 118° C., and particularly preferably 100 to 115° C. When Tg is in this range, the resulting film has excellent heat resistance and dimensional stability, and readily exhibits the refractive index properties required when used as a luminance-improving member or a reflective polarizer for a liquid crystal display. The melting point and the glass transition temperature can be adjusted by controlling, for example, the type and amount of copolymer component, and diethylene glycol, which is a by-product.

The polyester used for birefringent layers preferably has an intrinsic viscosity of 0.50 to 0.75 dl/g, more preferably 0.55 to 0.72 dl/g, and even more preferably 0.56 to 0.71 dl/g, as measured at 35° C. using an o-chlorophenol solution. By having such an intrinsic viscosity, the birefringent layer tends to readily have appropriately oriented crystallinity, and a difference in the refractive index between the birefringent layer and the isotropic layer tends to easily increase.

Isotropic Layer

The isotropic layer of the multilayer laminated film according to one embodiment of the present disclosure is a layer having isotropic properties. That is, the resin of the isotropic layer (also referred to as the "second resin" in the present disclosure) is capable of forming isotropic layers. Thus, the resin that forms the isotropic layer is preferably an amorphous resin. In particular, an amorphous polyester is preferred. The term "amorphous" as used herein does not exclude a resin having slight crystalline properties, but includes any resin that can make the layer isotropic to an extent that the multilayer laminated film according to the present invention can have the intended function.

Copolyester for Isotropic Layer

The resin that forms the isotropic layers is preferably a copolyester. It is particularly preferable to use a copolyester containing a naphthalenedicarboxylic acid component, an ethylene glycol component, and a trimethylene glycol component as copolymer components. Examples of the naphthalenedicarboxylic acid component include a 2,6-naphthalenedicarboxylic acid component, a 2,7-naphthalenedicarboxylic acid component, components derived from a combination of these components, and derivative components thereof. Particularly preferred examples include a 2,6-naphthalenedicarboxylic acid component and derivative components thereof. The copolymer component as referred to herein means any of the components that constitute the polyester. The copolymer component is not limited to a copolymer component as a minor component (which is used in an amount for copolymerization of less than 50 mol %, based on the total amount of the acid component or the total amount of the diol component), and also includes a main component (which is a component used in an amount for copolymerization of 50 mol % or more, based on the total amount of the acid component or the total amount of the diol component).

In one embodiment of the present disclosure, a polyester having an ethylene naphthalate unit as a main component is preferably used as a resin for isotropic layers, as described above. This is preferable because the use of a copolyester containing a naphthalenedicarboxylic acid component as the resin for isotropic layers increases the compatibility with birefringent layers, and tends to improve interlayer adhesion to the birefringent layers, and so delamination is less likely to occur.

The copolyester for isotropic layers preferably contains at least two components, i.e., an ethylene glycol component and a trimethylene glycol component, as diol components. Of these, the ethylene glycol component is preferably used as the main diol component from the viewpoint of film formability etc.

The copolyester for isotropic layers in one embodiment of the present disclosure preferably further contains a trimethylene glycol component as a diol component. The presence of a trimethylene glycol component in the copolyester compensates for the elasticity of the layer structure to enhance the effect of suppressing delamination.

The naphthalenedicarboxylic acid component, preferably a 2,6-naphthalenedicarboxylic acid component, preferably accounts for 30 mol % or more and 100 mol % or less, more preferably 30 mol % or more and 80 mol % or less, and even more preferably 40 mol % or more and 70 mol % or less, of the entire carboxylic acid component of the copolyester for isotropic layers. Using this component in the above range can further increase the adhesion to the birefringent layer. If the content of the naphthalenedicarboxylic acid component is less than the lower limit, lower adhesion may result in view of compatibility. The upper limit of the content of the naphthalenedicarboxylic acid component is not particularly limited; however, if the amount is too large, it tends to be difficult to increase a difference in refractive index between the birefringent layer and the isotropic layer. In order to adjust the relationship between the refractive index of the birefringent layer and the refractive index of the isotropic layer, other dicarboxylic acid components may also be copolymerized.

The amount of the ethylene glycol component is preferably 50 mol % or more and 95 mol % or less, more preferably 50 mol % or more and 90 mol % or less, even more preferably 50 mol % or more and 85 mol % or less, and particularly preferably 50 mol % or more and 80 mol % or less of the entire diol component of the copolyester for isotropic layers. By using this component in the above range, a difference in refractive index between the birefringent layer and the isotropic layer tends to easily increase.

The amount of the trimethylene glycol component is preferably 3 mol % or more and 50 mol % or less, more preferably 5 mol % or more and 40 mol % or less, even more preferably 10 mol % or more and 40 mol % or less, and particularly preferably 10 mol % or more and 30 mol % or less, of the entire diol component of the copolyester for isotropic layers. Using this component in the above range can further increase the interlayer adhesion to the birefringent layer; furthermore, a difference in refractive index between the birefringent layer and the isotropic layer tends to easily increase. If the content of the trimethylene glycol component is less than the lower limit, ensuring the interlayer adhesion tends to be difficult. If the content of the trimethylene glycol component is more than the upper limit, it is difficult to obtain a resin having the desired refractive index and glass transition temperature.

The isotropic layer in one embodiment of the present disclosure may contain a thermoplastic resin other than the copolyester as an additional polymer component in an amount in the range of 10 mass % or less, based on the mass of the isotropic layer, as long as the object of the present disclosure is not impaired.

Properties of Polyester for Isotropic Layer

In one embodiment of the present disclosure, the copolyester for isotropic layers described above preferably has a glass transition temperature of 85° C. or more, more preferably 90° C. or more and 150° C. or less, even more preferably 90° C. or more and 120° C. or less, and particularly preferably 93° C. or more and 110° C. or less. This provides more excellent heat resistance. In addition, a difference in refractive index between the birefringent layer and the isotropic layer tends to easily increase. If the glass transition temperature of the copolyester for isotropic layers is less than the lower limit, sufficient heat resistance may not be obtained. For example, when subjected to a process including a step of heat treatment at about 90° C. or the like, the isotropic layer is likely to suffer crystallization or embrittlement, thereby increasing haze; accordingly, the resulting film may exhibit a lower degree of polarization when used as a luminance-improving member or a reflective polarizer. On the other hand, when the glass transition temperature of the copolyester for isotropic layers is too high, stretching is also likely to impart birefringence to the polyester for isotropic layers due to stretching; accordingly, the difference in the refractive index in the stretching direction between the birefringent layer and the isotropic layer is reduced, thus causing the reflection performance to be poor.

Among the copolyesters mentioned above, amorphous copolyesters are preferred from the viewpoint of extremely excellent suppression of haze increase caused by crystallization in a heat treatment at a temperature of 90° C. for 1000 hours. The term "amorphous" as used herein means that when the temperature is increased at a temperature increase rate of 20° C./minute in measurement using a DSC, the heat of crystal fusion is less than 0.1 mJ/mg.

Specific examples of the copolyester for isotropic layers include (1) a copolyester containing a 2,6-naphthalenedicarboxylic acid component as a dicarboxylic acid component, and an ethylene glycol component and a trimethylene glycol component as diol components; and (2) a copolyester containing a 2,6-naphthalenedicarboxylic acid component and a terephthalic acid component as dicarboxylic acid components, and an ethylene glycol component and a trimethylene glycol component as diol components.

The copolyester for isotropic layers preferably has an intrinsic viscosity of 0.50 to 0.70 dl/g, more preferably 0.55 to 0.65 dl/g, as measured using an o-chlorophenol solution at 35° C. When the copolyester used for isotropic layers has a trimethylene glycol component as a copolymer component, the film-forming properties may be poor. The film-forming properties can be enhanced by using a copolyester having an intrinsic viscosity within the above range. The intrinsic viscosity of the copolyester used as the isotropic layer is preferably higher from the viewpoint of film-forming properties; however, when the intrinsic viscosity is higher than the upper limit, the difference in melt viscosity between the polyester for birefringent layers and the polyester for isotropic layers increases, which may cause the thickness of the layers to be non-uniform.

Other Layers

Outermost Layer

The multilayer laminated film according to one embodiment of the present disclosure can comprise an outermost layer on one or both of its surfaces. The outermost layer is composed mainly of a resin. Here, the phrase "composed mainly of a resin" means that a resin accounts for 70 mass % or more, preferably 80 mass % or more, and more preferably 90 mass % or more, of the total mass of the layer. The outermost layer is preferably an isotropic layer. The outermost layer may be composed of the same resin as that for isotropic layers from the viewpoint of easy production, and can be formed of the copolyester for isotropic layers; such an embodiment is preferred.

Intermediate Layer

The multilayer laminated film according to one embodiment of the present disclosure may comprise one or more intermediate layers.

In the present disclosure, the intermediate layer may also be referred to as, for example, the "inner thick layer" and means a thick layer present inside of the alternately laminated structure of the birefringent layer and the isotropic layer. The term "thick" as used herein means that the film is optically thick. In the present disclosure, a method is preferably used in which a thick layer (which may be referred to as "thickness adjustment layer" or "buffer layer") is formed on both sides of the alternately laminated structure in the initial stage of the production of the multilayer laminated film, and the number of layers laminated is then increased by doubling. In this case, two thick layers are laminated to form an intermediate layer; a thick layer formed inside is referred to as an "intermediate layer," and a thick layer formed outside is referred to as an "outermost layer."

The intermediate layer preferably has a layer thickness of, for example, 5 μm or more and 100 μm or less, and more preferably 50 μm or less. When such an intermediate layer is provided in part of the alternately laminated structure of the birefringent layer and the isotropic layer, the thickness of the layers constituting the birefringent layers and the isotropic layers can be easily adjusted to be made uniform without affecting the polarization function. The intermediate layer may have the same composition as the composition of the birefringent layers or the composition of the isotropic layers, or may have a composition that partially includes the composition of the birefringent layers or the composition of the isotropic layers. The intermediate layer is thick, and thus does not contribute to the reflection properties. On the other hand, the intermediate layer may affect the light transmission properties; therefore, when the layer contains particles, the particle diameter and the particle concentration can be selected in consideration of light transmittance.

If the thickness of the intermediate layer is less than the lower limit, the layer structure of the multilayer structure may be disordered, and the reflection performance may be reduced. On the other hand, if the thickness of the intermediate layer is more than the upper limit, the entire multilayer laminated film may be too thick, which makes it difficult to save space when the film is used as a reflective polarizer or a luminance-improving member for a thin liquid crystal display. When the multilayer laminated film contains a plurality of intermediate layers, the thickness of each intermediate layer is preferably not less than the lower limit of the range of the thickness described above, and the total thickness of the intermediate layers is preferably not greater than the upper limit of the range of the thickness described above.

The polymer used for the intermediate layer may be a resin different from the resin for birefringent layers or the resin for isotropic layers, as long as the polymer can be incorporated into the multilayer structure by using the method for producing the multilayer laminated film according to the present disclosure. From the viewpoint of the interlayer adhesion, the resin preferably has the same composition as that of either the birefringent layer or the isotropic layer, or a composition partially including the composition of either the birefringent layer or the isotropic layer.

The method for forming the intermediate layer is not particularly limited. For example, a thick layer is provided on both sides of the alternately laminated structure before doubling, which is divided into two in the direction perpendicular to the alternately laminated direction by using a branch block called a layer doubling block, and the divided layers are laminated again in the alternately laminated direction, so that one intermediate layer can be provided. A plurality of intermediate layers can also be provided by dividing the alternately laminated structure into three or four by a similar technique.

Coating Layer

The multilayer laminated film according to one embodiment of the present disclosure can have a coating layer on at least one surface of the film.

Examples of such coating layers include a high-slipperiness layer for imparting slipperiness; a primer layer for imparting adhesion to a prism layer, a diffusion layer, etc.; and the like. The coating layer contains a binder component and may contain, for example, particles, in order to impart slipperiness. To impart easy adhesion, for example, a binder component chemically close to the component of the layer to be adhered may be used. The coating liquid for forming the coating layer is preferably a water-based coating liquid using water as a solvent, from the environmental point of view, and particularly in such a case or other cases, for the purpose of improving wettability of the coating liquid onto the multilayer laminated film, the coating liquid can contain a surfactant. A functional agent may also be added; for example, a crosslinking agent may be added to improve the strength of the coating layer.

Method for Producing Multilayer Laminated Film

The method for producing the multilayer laminated film according to one embodiment of the present disclosure is described below in detail. The production method described below is an example, and the present disclosure is not limited to this. Further, different embodiments of the film can be obtained with reference to the following method.

The multilayer laminated film according to one embodiment of the present disclosure can be obtained by the following method. After a polymer for forming birefringent layers and a polymer for forming isotropic layers are alternately laminated in a molten state using a multilayer feed block device to form an alternately laminated structure comprising, for example, 30 layers or more in total, a buffer layer is formed on both sides of the laminated structure. The alternately laminated structure having the buffer layers is then divided into, for example, two to four by using an apparatus called "layer doubling," and the divided layers are laminated again with the alternately laminated structure having the buffer layers as one block; therefore, the number of laminated blocks (the number of doublings) becomes two- to four-fold, thereby increasing the number of laminated layers. According to this method, it is possible to obtain a multilayer laminated film comprising an intermediate layer, which is formed of a laminate of two buffer layers, inside of the multilayer structure, and an outermost layer, which is composed of one buffer layer, on both sides of the multilayer structure.

This multilayer structure is formed by laminating the layers in such a manner that the thickness of the birefringent layers and the thickness of the isotropic layers each have a desired inclination in thickness profile. This can be achieved, for example, by changing the width or length of slits in a multilayer feed block device. For example, the birefringent layers and isotropic layers have a different slope change rate in at least two optical thickness regions. Accordingly, the width or length of the slits in the multilayer feed block may be adjusted so that the at least two optical thickness regions each have at least one or more inflection points.

After a desired number of layers are laminated by the method described above, the layers are extruded from a die and cooled on a casting drum to obtain a multilayer unstretched film. The multilayer unstretched film is preferably stretched in at least one axial direction (this one axial direction being along the film surface) selected from the axial direction of the film-forming machine, and the direction orthogonal thereto on the film surface (which may be referred to as "traverse direction," "width direction", or "TD"). The stretching temperature is preferably in the range of a glass transition temperature (Tg) of the polymer for birefringent layers to (Tg+20)° C. The orientation properties of the film can be more precisely controlled by stretching the film at a temperature lower than a conventional stretching temperature.

The stretch ratio is preferably from 2.0- to 7.0-fold, and more preferably from 4.5- to 6.5-fold. Within this range, the greater the stretch ratio is, the smaller is the variation in the refractive index in the surface direction of the individual layers of the birefringent layers and isotropic layers due to the thinning by the stretching, light interference of the multilayer laminated film becomes uniform in the surface direction, and the difference in refractive index between the birefringent layer and the isotropic layer in the stretching direction preferably increases. The stretching method used for this stretching can be a known stretching method, such as heat stretching using a rod heater, roll heat stretching, or tenter stretching. Tenter stretching is preferable from the viewpoint of, for example, reduction in scratches due to contact with a roller, and stretching speed.

When the film is also subjected to a stretching process in the direction orthogonal to the stretching direction on the film surface (Y-direction) to perform biaxial stretching, the stretch ratio is preferably as low as about 1.01- to 1.20-fold, in order to impart reflective polarization properties to the film; however, the desired stretch ratio varies depending on the purpose of use. If the stretching ratio in the Y-direction is further increased, the polarization performance may deteriorate.

Further, the orientation properties of the obtained multilayer laminated film can be more precisely controlled by toe-out (re-stretching) in the stretching direction in the range of 5 to 15% after stretching, while performing heat setting at a temperature of Tg to (Tg+30)° C.

In one embodiment of the present disclosure, when the coated layer described above is provided, the application of the coating liquid to the multilayer laminated film can be performed at any stage, and is preferably performed during the film production process. The coating liquid is preferably applied to the film before stretching.

The multilayer laminated film according to one embodiment of the present disclosure is thus obtained.

When the multilayer laminated film is to be used for a metallic luster film or a reflective mirror, the film is preferably a biaxially stretched film. In this case, either a sequential biaxial stretching method or a simultaneous biaxial stretching method can be used. The stretch ratio may be adjusted so that the refractive index and the film thickness of the birefringent layers and those of isotropic layers provide the desired reflection properties. For example, in consideration of general refractive indexes of the resins forming these layers, the stretch ratio may be about 2.5- to 6.5-fold in both the machine direction and the traverse direction.

Use

Below, preferable use of the multilayer laminated film according to the present disclosure will be described. It is particularly preferable that the multilayer laminated film according to the present disclosure be used as a luminance-improving member or reflective polarizer.

Use as a Luminance-Improving Member

The multilayer laminated film according to the present disclosure in which the above embodiments in terms of the polymer composition, layer structure, and orientation are adopted exhibits properties of selectively reflecting one polarized light component and selectively transmitting the other polarized light component perpendicular to the above polarized light component. More specifically, this embodiment is directed to a uniaxially stretched multilayer laminated film. With such properties, the multilayer laminated film can be used as a luminance-improving member for liquid crystal displays or the like. When the multilayer laminated film is used as a luminance-improving member, one polarized light component is transmitted, and the other polarized light component that is not transmitted, is reflected to the light source side without being absorbed, and so the light can be reused, exerting an excellent luminance-improving effect.

Further, a curable resin layer such as a prism layer or a diffusion layer may be laminated on at least one surface of the multilayer laminated film according to the present disclosure. The curable resin layer as used herein refers to a thermosetting resin layer or an electron beam-curable resin layer. In this embodiment, a prism layer or diffusion layer can be laminated via a coating layer having a primer function or the like, which is preferable.

By bonding a part such as a prism layer to the multilayer laminated film according to the present disclosure, or by forming a prism layer or the like on a surface of the multilayer laminated film according to the present disclosure, to form a single unit, the number of parts to be assembled can be reduced, and the thickness of liquid crystal displays can be reduced. Further, by bonding these parts to the multilayer laminated film according to the present disclosure, delamination due to an external force applied during processing or the like can be suppressed, and so a more reliable luminance-improving member can be provided. The multilayer laminated film according to the present disclosure may be used as a luminance-improving member, for example, in an embodiment of a liquid crystal display device comprising a luminance-improving member disposed between a light source for liquid crystal display and a liquid crystal panel composed of a polarizer, liquid crystal cell, and polarizer. To further provide a prism layer or prism, it is preferable to dispose the prism layer or prism on the luminance-improving member on the liquid crystal panel side.

Use as a Reflective Polarizer

The multilayer laminated film according to the present disclosure, alone or in combination with an absorptive polarizer, can be used as a polarizer for liquid crystal displays or the like. In particular, a multilayer laminated film having improved reflective polarizing performance and a degree of polarization (P) (described later) as high as 85% or more, preferably 90% or more, and more preferably 99.5% or more can be used alone as a polarizer for liquid crystal display that is used adjacent to a liquid crystal cell without using an absorptive polarizer in combination.

More specifically, examples of the use of the laminated multilayer film according to the present disclosure include a liquid crystal display in which a first polarizer comprising the laminated multilayer film according to the present disclosure, a liquid crystal cell, and a second polarizer are laminated in this order.

EXAMPLES

Embodiments of the present disclosure are described below with reference to Examples; however, the present disclosure is not limited to the Examples shown below. The physical properties and characteristics in the Examples were measured or evaluated by the following methods.

(1) Thickness of Each Layer

A multilayer laminated film was cut out to a size of 2 mm in the longitudinal direction of the film and 2 cm in the width direction, fixed to an embedding capsule, and then embedded in an epoxy resin (Epomount, manufactured by Refine Tec Ltd.). The embedded sample was cut perpendicularly to the width direction with a microtome (Ultracut-UCT, manufactured by Leica) to obtain a thin section with a thickness of 50 nm. The thin section of the film was observed and photographed at an accelerating voltage of 100 kV using a transmission electron microscope (Hitachi S-4300). The thickness (physical thickness) of each layer was measured from the photograph.

With respect to the layers having a thickness of more than 1 μm, a layer present inside the multilayer structure was regarded as an intermediate layer, and a layer present on the outermost surface layer of the multilayer structure was regarded as an outermost layer. The thickness of each of the layers was measured.

The optical thickness of the birefringent layers and that of isotropic layers were each calculated by substituting the physical thickness value of each layer obtained above and the refractive index (nX) value of each layer calculated according to the following (2) into the above Formula 2. For the birefringent layers, the average optical thicknesses of the monotonically increasing region were calculated with respect to a region in which the optical thickness was 100 nm or less from an end on the side in which the optical thickness was smaller and a region in which the optical thickness was more than 100 nm from an end on the side in which the optical thickness was greater. Similarly, for the isotropic layer, the average optical thicknesses of the monotonically increasing region were calculated with respect to a region in which the optical thickness was 200 nm or less from an end on the side in which the optical thickness was smaller and a region in which the optical thickness was more than 200 nm from an end on the side in which the optical thickness was greater.

Whether each layer is a birefringent layer or an isotropic layer can be determined based on the refractive index. When it is difficult to determine, it can be determined based on NMR analysis or the electronic state by TEM analysis.

(2) Refractive Index after Stretching in Each Direction

The refractive indexes of the birefringent layer and isotropic layer of the multilayer laminated film were calculated as follows. Specifically, a two-layer laminated film with a layer thickness ratio of 1:1 was produced under the same production conditions as those of the obtained multilayer laminated film. The refractive indexes of the birefringent layer and the isotropic layer of the two-layer laminated film were measured as the refractive indexes of the birefringent layer and the isotropic layer of the multilayer laminated film, respectively.

For example, in this embodiment, a film having a total thickness of 75 μm was produced under the same conditions as in Example 1 described later, except that the film was a two-layer laminated film having a thickness ratio of birefringent layer:isotropic layer of 1:1. For the birefringent layer and isotropic layer, refractive indexes in the stretching direction (X-direction), the direction orthogonal thereto (Y-direction), and the thickness direction (Z-direction) (individually referred to as "nX", "nY", and "nZ") were measured at a wavelength of 633 nm using a Metricon prism coupler, and the obtained values were used as the refractive indexes of the birefringent layer and the isotropic layer after stretching.

(3) Determination of Monotonic Increase

In an arbitrary region of layer thickness profiles, which were individually prepared by imputing the optical thickness of the birefringent layers or the optical thickness of the isotropic layers on the ordinate and the layer number of each layer on the abscissa, the number of the layers of the birefringent layers or the isotropic layers within the range showing an increasing tendency in film thickness was equally divided into five. If the average values of the film thicknesses in each equally divided area all increased in the direction in which the film thickness increased, the tendency was regarded as a monotonic increase; if this was not the case, the tendency was not regarded as a monotonic increase.

In the monotonically increasing region of the birefringent layers, the layer at the end on the side in which the optical thickness was smaller and the layer at the end on the side in which the optical thickness was greater were determined. Further, the slope of the first approximate straight line of the layer thickness profile of the region in which the optical thickness was 100 nm or less from the end on the side in which the optical thickness was smaller was defined as "1A," and the slope of the first approximate straight line of the layer thickness profile of the region in which the optical thickness was more than 100 nm to the end on the side in which the optical thickness was greater was defined as "1B." In the monotonically increasing region of the isotropic layers, the layer at the end on the side in which the optical thickness was smaller and the layer at the end on the side in which the optical thickness was greater were determined. Further, the slope of the first approximate straight line of the layer thickness profile of the region in which the optical thickness was 200 nm or less from the end on the side in which the optical thickness was smaller was defined as "2A," and the slope of the first approximate straight line of the layer thickness profile of the region in which the optical thickness was more than 200 nm to the end on the side in which the optical thickness was greater was defined as "2B." From these obtained values, 1B/1A and 2B/2A were calculated.

(4) Evaluation of Color and Average Reflectance

The reflection spectrum of the obtained multilayer laminated film was measured using a polarized-film measuring device (VAP7070S; manufactured by JASCO Corporation). For the measurement, a spot diameter adjusting mask Φ1.4 and an angle-adjustable stage were used, and the angle of incidence of measurement light was set to 0 degrees. The transmittance of light in the wavelength range of 380 to 780 nm in the axial direction perpendicular to the transmission axis of the multilayer laminated film (referred to as the "reflection axis") was measured at each wavelength at intervals of 5 nm. The reflection axis was determined according to crossed Nicols search (650 nm). The average value of transmittance of light in the wavelength range of 380 to 780 nm was determined, and the value obtained by subtracting the average transmittance from 100 was defined as the average reflectance in the direction of the reflection axis at normal incidence. When the average reflectance was 50% or more, the measured multilayer laminated film was determined to be capable of reflecting light in the direction of the reflection axis. For use in optics such as luminance-improving members, the average reflectance is 85% or more, preferably 87% or more, and more preferably 90% or more.

The color of the multilayer laminated film was evaluated by the following method. That is, the average transmittance in the wavelength range of 505 to 555 nm and the average transmittance in the wavelength range of 555 to 605 nm were determined from the transmission spectra obtained by the above measurement. When the ratio of these values was closer to 1.0, the color viewed from the front direction of the multilayer laminated film was evaluated to be more uniform. From the above viewpoints, the ratio (average transmittance in the wavelength range of 505 to 555 nm)/(average transmittance in the wavelength range of 555 to 605 nm) is preferably 1.0±0.7, more preferably 1.0±0.5, still more preferably 1.0±0.3, and even more preferably 1.0±0.1.

(5) Maximum Transmittance Value at a Wavelength of 750 to 850 nm

For the obtained multilayer laminated film, the transmittance of light in the direction of the transmission axis and the transmittance of light in the axial direction perpendicular to the transmission axis (reflection axis) in a wavelength range of 300 nm to 1200 nm were measured to obtain optical spectra using a spectrophotometer (UV-3101PC and MPC-3100, manufactured by Shimadzu Corporation). The angle of incidence of measurement light was set at 0 degrees.

The wavelength range of 750 to 850 nm overlaps with the visible light region (in particular, red light region) due to the shift of the spectra to the short-wavelength side when the film is viewed from an oblique direction (direction at an incident angle of 45 to 60 degrees). Therefore, a large maximum value of transmittance of light in this wavelength range represents a tendency of the occurrence of more notable coloring of the multilayer laminated film when the multilayer laminated film is viewed from an oblique direction. Notable coloring when the multilayer laminated film is viewed from an oblique direction means that the reflection wavelength range is narrow. Therefore, the maximum value of transmittance of light in a wavelength of 750 to 850 nm is preferably 38% or less, more preferably 36% or less, still more preferably 34% or less, and even more preferably 30% or less.

(6) Degree of Polarization

The visibility corrected polarization degree of the obtained multilayer laminated film was measured using a polarizing-film measuring device (VAP7070S; manufactured by JASCO Corporation), and the obtained value was defined as a degree of polarization (P) (unit: %). For the measurement, a spot diameter adjusting mask Φ1.4 and an angle-adjustable stage were used, and the angle of incidence of measurement light was set to 0 degrees, and calculation was made based on the average transmittance of light (wavelength range: 400 to 800 nm) in the direction of the transmission axis and in the axial direction perpendicular to the transmission axis of the multilayer laminated film. The axis was determined according to crossed Nicols search (650 nm).

The degree of polarization (P) is preferably 75% or more. For use in optics such as luminance-improving members, the degree of polarization (P) is preferably 76% or more, more preferably 77% or more, and still more preferably 78% or more.

Production Example 1: Polyester A

A polyester for birefringent layers was prepared as follows. Dimethyl 2,6-naphthalenedicarboxylate, dimethyl terephthalate, and ethylene glycol were subjected to a transesterification reaction in the presence of titanium tetrabutoxide, and subsequently further subjected to a polycondensation reaction to prepare a copolyester in which 95 mol % of the acid component is a 2,6-naphthalenedicarboxylic acid component, 5 mol % of the acid component was a terephthalic acid component, and the glycol component was an ethylene glycol component (intrinsic viscosity: 0.64 dl/g; measured using o-chlorophenol at 35° C.; this also applies below).

Production Example 2: Polyester B

A polyester for isotropic layers was prepared as follows. Dimethyl 2,6-naphthalenedicarboxylate, dimethyl terephthalate, ethylene glycol, and trimethylene glycol were subjected to a transesterification reaction in the presence of titanium tetrabutoxide, and subsequently further subjected to a polycondensation reaction to prepare a copolyester in which 50 mol % of the acid component was a 2,6-naphthalenedicarboxylic acid component, 50 mol % of the acid component was a terephthalic acid component, 85 mol % of the glycol component was an ethylene glycol component, and 15 mol % of the glycol component is a trimethylene glycol component (intrinsic viscosity: 0.63 dl/g).

Example 1

Polyester A for birefringent layers was dried at 170° C. for 5 hours. Thereafter, polyester B for isotropic layers was dried at 85° C. for 8 hours. Thereafter, polyester A and polyester B were respectively fed to first and second extruders, and heated to 300° C. so that they were in a molten state. The polyester for birefringent layers was divided into 138 layers, and the polyester for isotropic layers was divided into 137 layers. A melt in a laminated state having 275 layers in total was obtained using a multilayer feed block device equipped with comb teeth for alternately laminating the birefringent layer and the isotropic layer and obtaining the layer thickness profile shown in Table 1. While the laminated state was maintained, the same polyester as the polyester for isotropic layers was introduced to both sides of the melt from a third extruder toward a three-layer feed block to further laminate a buffer layer on both sides in the laminating direction of the melt (both surface layers of which were birefringent layers) in a laminated state having 275 layers. The feed rate of the third extruder was adjusted so that the total of the buffer layers on both sides was 47% of the whole. The laminated state was further divided into two parts by using a layer-doubling block, and they were laminated at a ratio of 1:1, thereby preparing an unstretched multilayer laminated film having 553 layers in total, including an intermediate layer inside the film and two outermost layers on the outermost surfaces of the film.

The unstretched multilayer laminated film was stretched 5.9-fold in the width direction at a temperature of 130° C. The obtained uniaxially stretched multilayer laminated film had a thickness of 75 μm.

Examples 2 to 8 and Comparative Examples 1 to 8

Uniaxially stretched multilayer laminated films were obtained in the same manner as in Example 1, except that the multilayer feed block device used was changed so that the layer thickness profiles shown in Table 1 were obtained.

TABLE 1

| | | | Ex. 1 | Ex. 2 | Ex. 3 | Ex. 4 | Ex. 5 | Ex. 6 | Ex. 7 | Ex. 8 |
|---|---|---|---|---|---|---|---|---|---|---|
| Birefringent layer | Refractive index | nX | — | 1.849 | 1.849 | 1.849 | 1.849 | 1.849 | 1.849 | 1.849 |
| | Thinnest layer (in monotonically increasing region) | Layer number | — | 1 | 1 | 1 | 1 | 1 | 1 | 1 |
| | | Layer thickness | nm | 27 | 27 | 27 | 27 | 27 | 27 | 27 | 27 |
| | | Optical thickness | nm | 50 | 50 | 50 | 50 | 50 | 50 | 50 | 50 |
| | Layer with an optical thickness of 100 nm (in monotonically increasing region) | Layer number | — | 41 | 41 | 59 | 59 | 47 | 47 | 53 | 53 |
| | | Layer thickness | nm | 54 | 54 | 54 | 54 | 54 | 54 | 54 | 54 |
| | | Optical thickness | nm | 100 | 100 | 100 | 100 | 100 | 100 | 100 | 100 |
| | Thickest layer (in monotonically increasing region) | Layer number | — | 138 | 138 | 138 | 138 | 138 | 138 | 138 | 138 |
| | | Layer thickness | nm | 108 | 108 | 108 | 108 | 108 | 108 | 108 | 108 |
| | | Optical thickness | nm | 200 | 200 | 200 | 200 | 200 | 200 | 200 | 200 |
| | Average optical thickness (in monotonically increasing region) | Thinner layer | nm | 75 | 75 | 75 | 75 | 75 | 75 | 75 | 75 |
| | | Thicker layer | nm | 150 | 150 | 150 | 150 | 150 | 150 | 150 | 150 |
| | Slope of thickness profile (in monotonically increasing region) | 1A | — | 1.25 | 1.25 | 0.86 | 0.86 | 1.09 | 1.09 | 0.96 | 0.96 |
| | | 1B | — | 1.03 | 1.03 | 1.27 | 1.27 | 1.10 | 1.10 | 1.18 | 1.18 |
| | | 1B/1A | — | 0.82 | 0.82 | 1.48 | 1.48 | 1.01 | 1.01 | 1.23 | 1.23 |
| Isotropic layer | Refractive index | nX | — | 1.623 | 1.623 | 1.623 | 1.623 | 1.623 | 1.623 | 1.623 | 1.623 |
| | Thinnest layer (in monotonically increasing region) | Layer number | — | 1 | 1 | 1 | 1 | 1 | 1 | 1 | 1 |
| | | Layer thickness | nm | 49 | 49 | 49 | 49 | 49 | 49 | 49 | 49 |
| | | Optical thickness | nm | 80 | 80 | 80 | 80 | 80 | 80 | 80 | 80 |
| | Layer with an optical thickness of 200 nm (in monotonically increasing region) | Layer number | — | 110 | 82 | 110 | 82 | 103 | 94 | 103 | 94 |
| | | Layer thickness | nm | 123 | 123 | 123 | 123 | 123 | 123 | 123 | 123 |
| | | Optical thickness | nm | 200 | 200 | 200 | 200 | 200 | 200 | 200 | 200 |
| | Thickest layer (in monotonically increasing region) | Layer number | — | 137 | 137 | 137 | 137 | 137 | 137 | 137 | 137 |
| | | Layer thickness | nm | 209 | 209 | 209 | 209 | 209 | 209 | 209 | 209 |
| | | Optical thickness | nm | 339 | 339 | 339 | 339 | 339 | 339 | 339 | 339 |
| | Average optical thickness (in monotonically increasing region) | Thinner layer | nm | 140 | 140 | 140 | 140 | 140 | 140 | 140 | 140 |
| | | Thicker layer | nm | 270 | 270 | 270 | 270 | 270 | 270 | 270 | 270 |
| | Slope of thickness profile (in | 2A | — | 1.10 | 1.48 | 1.10 | 1.48 | 1.18 | 1.29 | 1.18 | 1.29 |

TABLE 1-continued

| | | | | | | | | | | |
|---|---|---|---|---|---|---|---|---|---|---|
| monotonically increasing region) | 2B | — | 5.19 | 2.55 | 5.19 | 2.55 | 4.12 | 3.26 | 4.12 | 3.26 |
| | 2B/2A | — | 4.72 | 1.72 | 4.72 | 1.72 | 3.49 | 2.53 | 3.49 | 2.53 |
| Degree of polarization | | % | 86.5 | 79.1 | 84.1 | 76.6 | 81.5 | 80.4 | 79.4 | 78.9 |
| Maximum transmittance (750-850 nm) | | % | 33.3 | 19.6 | 37.1 | 21.8 | 33.4 | 26.1 | 35.0 | 26.2 |
| Average transmittance (505-555 nm) | | % | 8.7 | 9.9 | 9.9 | 13.7 | 10.4 | 8.9 | 12.9 | 10.6 |
| Average transmittance (555-605 nm) | | % | 5.3 | 10.0 | 6.2 | 11.2 | 8.8 | 11.0 | 7.9 | 11.9 |
| Transmittance ratio (505-555/555-605 nm) | | — | 1.64 | 0.99 | 1.60 | 1.22 | 1.18 | 0.81 | 1.63 | 0.89 |
| Average reflectance (380-780 nm) | | % | 90.4 | 88.6 | 90.1 | 86.9 | 89.4 | 88.3 | 88.9 | 87.4 |

| | | | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 |
|---|---|---|---|---|---|---|---|---|---|---|
| Birefringent layer | Refractive index | nX | 1.849 | 1.849 | 1.849 | 1.849 | 1.849 | 1.849 | 1.849 | 1.849 |
| | Thinnest layer (in monotonically increasing region) | Layer number | 1 | 1 | 1 | 1 | 1 | 1 | 1 | 1 |
| | | Layer thickness | 27 | 27 | 27 | 27 | 27 | 27 | 27 | 27 |
| | | Optical thickness | 50 | 50 | 50 | 50 | 50 | 50 | 50 | 50 |
| | Layer with an optical thickness of 100 nm (in monotonically increasing region) | Layer number | 36 | 36 | 41 | 41 | 59 | 59 | 63 | 63 |
| | | Layer thickness | 54 | 54 | 54 | 54 | 54 | 54 | 54 | 54 |
| | | Optical thickness | 100 | 100 | 100 | 100 | 100 | 100 | 100 | 100 |
| | Thickest layer (in monotonically increasing region) | Layer number | 138 | 138 | 138 | 138 | 138 | 138 | 138 | 138 |
| | | Layer thickness | 108 | 108 | 108 | 108 | 108 | 108 | 108 | 108 |
| | | Optical thickness | 200 | 200 | 200 | 200 | 200 | 200 | 200 | 200 |
| | Average optical thickness (in monotonically increasing region) | Thinner layer | 75 | 75 | 75 | 75 | 75 | 75 | 75 | 75 |
| | | Thicker layer | 84 | 84 | 150 | 150 | 150 | 150 | 150 | 150 |
| | Slope of thickness profile (in monotonically increasing region) | 1A | 1.43 | 1.43 | 1.25 | 1.25 | 0.86 | 0.86 | 0.81 | 0.81 |
| | | 1B | 0.98 | 0.98 | 1.03 | 1.03 | 1.27 | 1.27 | 1.33 | 1.33 |
| | | 1B/1A | 0.69 | 0.69 | 0.82 | 0.32 | 1.48 | 1.48 | 1.64 | 1.64 |
| Isotropic layer | Refractive index | nX | 1.623 | 1.623 | 1.623 | 1.623 | 1.623 | 1.623 | 1.623 | 1.623 |
| | Thinnest layer (in monotonically increasing region) | Layer number | 1 | 1 | 1 | 1 | 1 | 1 | 1 | 1 |
| | | Layer thickness | 49 | 49 | 49 | 49 | 49 | 49 | 49 | 49 |
| | | Optical thickness | 80 | 80 | 80 | 80 | 80 | 80 | 80 | 80 |
| | Layer with an optical thickness of 200 nm (in monotonically increasing region) | Layer number | 110 | 82 | 113 | 67 | 113 | 67 | 110 | 82 |
| | | Layer thickness | 123 | 123 | 123 | 123 | 123 | 123 | 123 | 123 |
| | | Optical thickness | 200 | 200 | 200 | 200 | 200 | 200 | 200 | 200 |
| | Thickest layer (in monotonically increasing region) | Layer number | 137 | 137 | 137 | 137 | 137 | 137 | 137 | 137 |
| | | Layer thickness | 209 | 209 | 209 | 209 | 209 | 209 | 209 | 209 |
| | | Optical thickness | 339 | 339 | 339 | 339 | 339 | 339 | 339 | 339 |
| | Average optical thickness (in monotonically increasing region) | Thinner layer | 140 | 140 | 140 | 140 | 140 | 140 | 140 | 140 |
| | | Thicker layer | 270 | 270 | 270 | 270 | 270 | 270 | 270 | 270 |
| | Slope of thickness profile (in monotonically increasing region) | 2A | 1.10 | 1.48 | 1.07 | 1.82 | 1.07 | 1.82 | 1.10 | 1.48 |
| | | 2B | 5.19 | 2.55 | 5.83 | 2.00 | 5.83 | 2.00 | 5.19 | 2.55 |
| | | 2B/2A | 4.72 | 1.72 | 5.45 | 1.10 | 5.45 | 1.10 | 4.72 | 1.72 |
| Degree of polarization | | | 85.7 | 83.0 | 86.3 | 70.9 | 81.3 | 66.6 | 81.4 | 73.6 |
| Maximum transmittance (750-850 nm) | | | 32.5 | 18.4 | 39.6 | 16.7 | 40.4 | 16.8 | 39.2 | 25.1 |
| Average transmittance (505-555 nm) | | | 10.8 | 10.7 | 7.0 | 17.5 | 9.8 | 17.6 | 9.8 | 13.3 |
| Average transmittance (555-605 nm) | | | 4.0 | 6.1 | 7.2 | 13.0 | 9.1 | 19.6 | 9.4 | 14.2 |
| Transmittance ratio (505-555/555-605 nm) | | | 2.70 | 1.75 | 0.97 | 1.35 | 1.08 | 0.90 | 1.04 | 0.94 |
| Average reflectance (380-780 nm) | | | 90.5 | 89.5 | 91.8 | 85.6 | 90.5 | 82.4 | 88.9 | 84.8 |

As is clear from Table 1, the multilayer laminated films of the Examples had a high degree of polarization, and uniform color, as well as reduced color when viewed from an oblique direction while maintaining a wide reflection wavelength range, compared to the multilayer laminated films of the Comparative Examples.

The multilayer laminated film according to one embodiment of the present disclosure can achieve a high degree of polarization, and uniform color, as well as reduced color when viewed from an oblique direction while maintaining a wide reflection wavelength range by appropriately designing the optical thickness of a birefringent layer and an isotropic layer that are alternately laminated. Accordingly, when the film is used as a luminance-improving member, a reflective polarizer, or the like, for which polarization performance is required, the film exhibits a high degree of polarization over a wide reflection wavelength range and reduced color. Therefore, more highly reliable luminance-improving members, polarizers for liquid crystal displays, and the like can be provided.

The disclosure of Japan Patent Application No. 2018-182867, filed on Sep. 27, 2018, is incorporated herein by reference in its entirety.

All of the documents, patent applications, and technical standards referred to in the present specification are incorporated herein by reference to the same extent in which these individual documents, patent applications, and technical standards were specifically and individually indicated to be incorporated by reference.

The invention claimed is:

1. A multilayer laminated film comprising a multilayer laminate in which a birefringent layer comprising a first resin and an isotropic layer comprising a second resin are alternately laminated,
the multilayer laminated film being capable of reflecting light with a wavelength of 380 to 780 nm due to optical interference caused from the lamination structure of the birefringent layer and the isotropic layer,
a series of the birefringent layers having a first monotonically increasing region of optical thickness, wherein the first monotonically increasing region comprises a monotonically increasing region 1A in which the maximum optical thickness is 100 nm or less, and a monotonically increasing region 1B in which the minimum optical thickness is more than 100 nm, and a ratio 1B/1A of a slope 1B of the monotonically increasing region 1B to a slope 1A of the monotonically increasing region 1A is 0.8 or more and 1.5 or less, a series of the isotropic layers having a second monotonically increasing region of optical thickness, wherein the second monotonically increasing region comprises a monotonically increasing region 2A in which the maximum optical thickness is 200 nm or less and a monotonically increasing region 2B in which the minimum optical thickness is more than 200 nm, and a ratio 2B/2A of a slope 2B of the monotonically increasing region 2B to a slope 2A of the monotonically increasing region 2A is more than 1.5 and less than 5.

2. The multilayer laminated film according to claim 1, wherein the monotonically increasing region 1A has an average optical thickness of 65 nm or more and 85 nm or less, and the monotonically increasing region 1B has an average optical thickness of 140 nm or more and 160 nm or less.

3. The multilayer laminated film according to claim 1, wherein the monotonically increasing region 2A has an average optical thickness of 130 nm or more and 155 nm or less, and the monotonically increasing region 2B has an average optical thickness of 250 nm or more and 290 nm or less.

4. The multilayer laminated film according to claim 1, wherein the multilayer laminated film has an average reflectance of light polarized parallel to a reflection axis at normal incidence of 85% or more in a wavelength range of 380 nm to 780 nm.

5. The multilayer laminated film according to claim 2, wherein the multilayer laminated film has an average reflectance of light polarized parallel to a reflection axis at normal incidence of 85% or more in a wavelength range of 380 nm to 780 nm.

6. The multilayer laminated film according to claim 3, wherein the multilayer laminated film has an average reflectance of light polarized parallel to a reflection axis at normal incidence of 85% or more in a wavelength range of 380 nm to 780 nm.

7. The multilayer laminated film according to claim 2, wherein the monotonically increasing region 2A has an average optical thickness of 130 nm or more and 155 nm or less, and the monotonically increasing region 2B has an average optical thickness of 250 nm or more and 290 nm or less.

8. The multilayer laminated film according to claim 7, wherein the multilayer laminated film has an average reflectance of light polarized parallel to a reflection axis at normal incidence of 85% or more in a wavelength range of 380 nm to 780 nm.

\* \* \* \* \*